March 18, 1924.            A. CAMPBELL            1,487,203
CAR
Filed Nov. 8, 1922       3 Sheets-Sheet 1
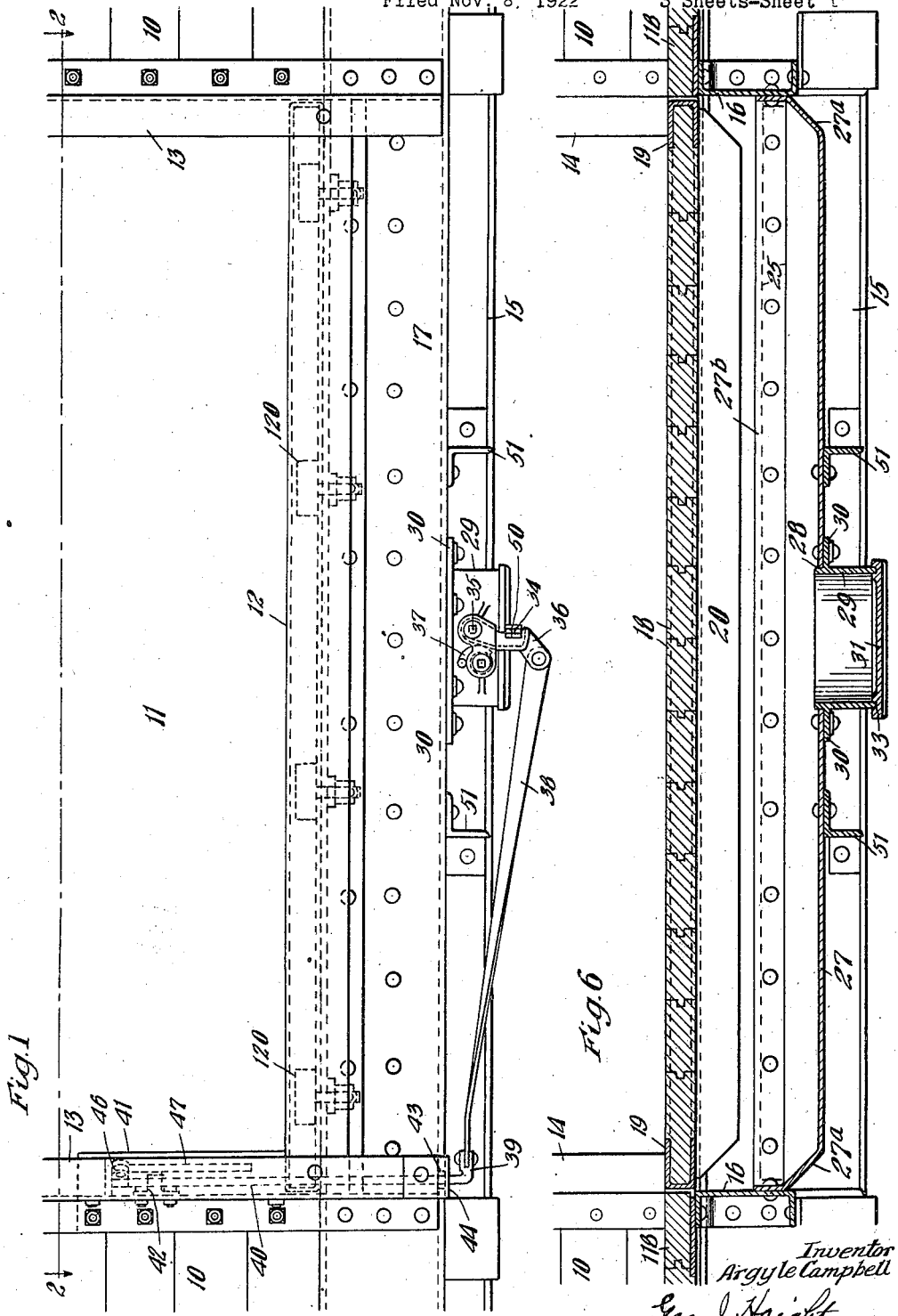
Inventor
Argyle Campbell
By Geo. J. Haight Atty.

March 18, 1924.                    A. CAMPBELL                    1,487,203
                                      CAR
                               Filed Nov. 8, 1922          3 Sheets-Sheet 2
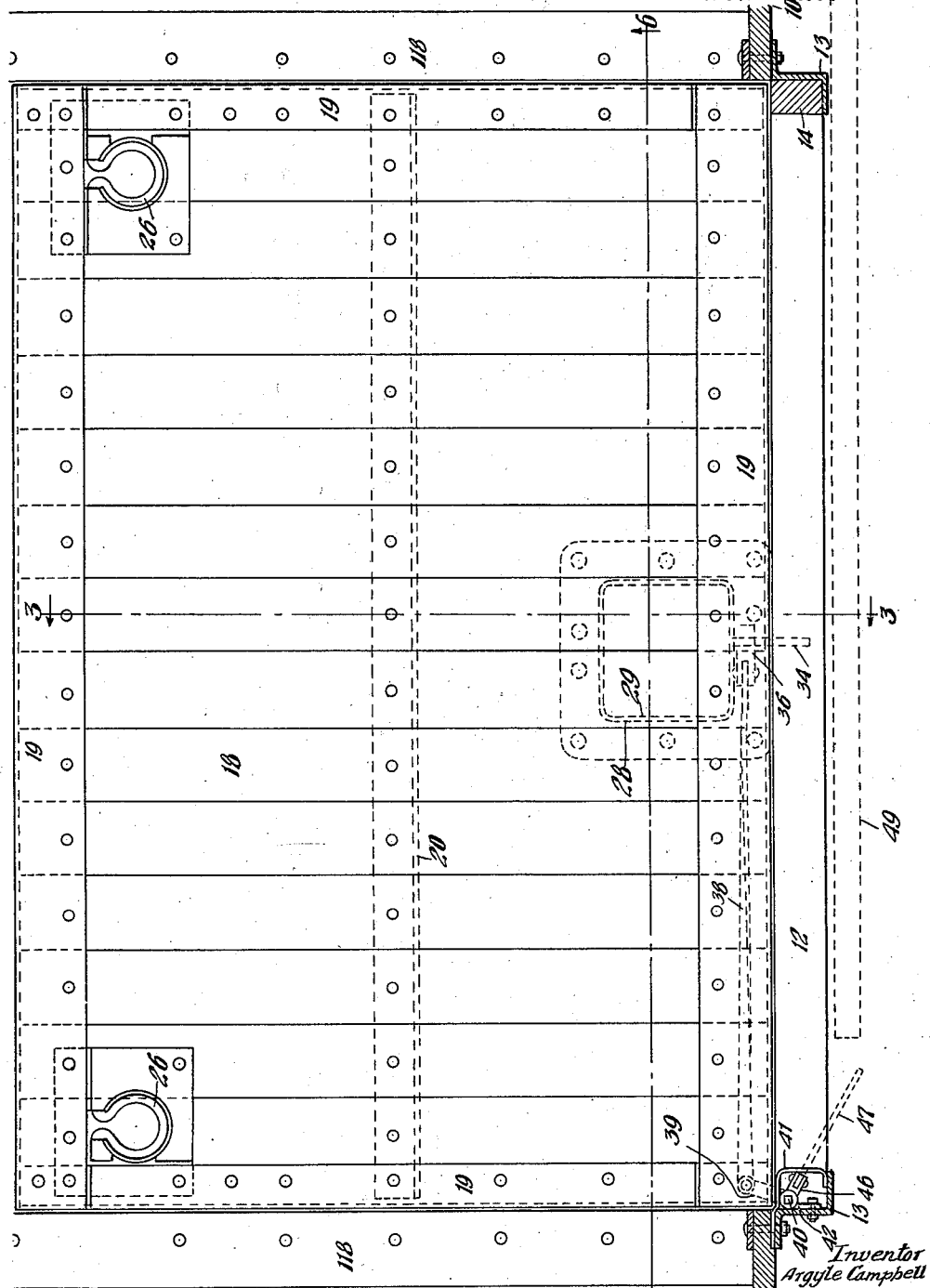

March 18, 1924.  A. CAMPBELL  1,487,203
CAR
Filed Nov. 8, 1922  3 Sheets-Sheet 3
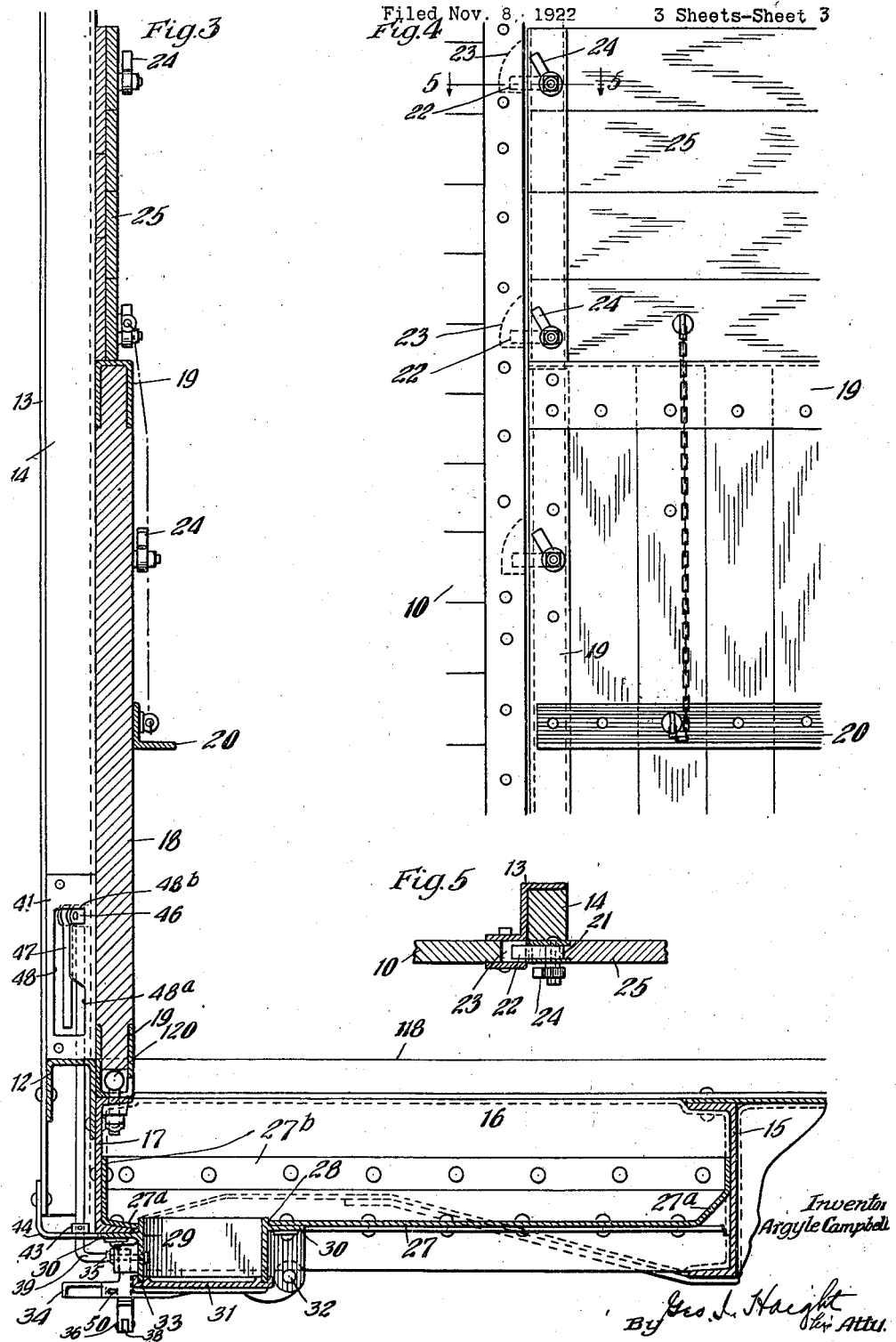

Patented Mar. 18, 1924.

1,487,203

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

CAR.

Application filed November 8, 1922. Serial No. 599,631.

*To all whom it may concern:*

Be it known that I, ARGYLE CAMPBELL, a citizen of the United States, residing at Chicago, in the county of Cook and State of Illinois, have invented a certain new and useful Improvement in Cars, of which the following is a full, clear, concise, and exact description, reference being had to the accompanying drawings, forming a part of this specification.

This invention relates to improvements in cars.

One object of the invention is to provide simple, substantial and relatively inexpensive means, in a box car, adapting the car, particularly for the carrying of grain and like materials in bulk.

Another object of the invention is to provide a box car which is readily convertible from a box car having the usual characteristics adapted for the carrying of packaged freight and the like, to one for carrying grain and the like, and wherein means are provided for discharging a sufficient quantity of the grain from behind the grain doors, to relieve the latter from pressure and permit opening thereof without injury to the doors or car body, prior to unloading proper of the car.

A specific object of the invention is to provide, in a grain car, a relief door and mechanism for operating the same, said mechanism being easily accessible when the car is to be unloaded and also so located, that, when the car is in transit with the usual outer side door closed and sealed, the relief door operating mechanism cannot be actuated or tampered with, without first opening the side door and thereby leaving visual evidence thereof.

Other objects of the invention will more clearly appear from the description and claims hereinafter following.

In the drawings forming a part of this specification, Figure 1 is a side elevation of a portion of a box car showing my improvements in connection therewith, the usual side door being indicated in open position to more fully reveal the details of my improvements. Fig. 2 is a horizontal sectional view corresponding to the section line 2—2 of Fig. 1. In this view, the side door is indicated, by dotted lines, in partially closed position, and the operating handle or lever of the relief door mechanism is indicated by dotted lines in elevated position. Fig. 3 is a vertical sectional view corresponding to the section line 3—3 of Fig. 2. Fig. 4 is an inside view looking toward the grain door and supplemental door shown in Fig. 3. Fig. 5 is a detail sectional view corresponding to line 5—5 of Fig. 4 and illustrating one of the latches. And Fig. 6 is a longitudinal vertical sectional view corresponding substantially to the line 6—6 of Fig. 2.

In said drawings, I have shown only so much of a box car as is necessary to illustrate my improvements, it being understood that the arrangement will preferably be duplicated on opposite sides of the car and that the body or superstructure of the car, except for those portions herein illustrated and described, may be of any desired type. In said drawings, the side wall of the car is indicated at 10, the same having a side door opening 11 therein, defined by side door posts, hereinafter described, threshold plate 12 and lintel, not shown. In constructing the side posts or jambs, I preferably employ Z-bars 13—13, best shown in Fig. 2, and wood fillers 14. In the case of the lefthand door post as viewed in Fig. 2, the filler 14 is omitted for a distance at the bottom in order to accommodate the relief door operating mechanism hereinafter described. The threshold plate as best seen in Fig. 3, preferably consists of a pressed plate of substantially inverted U-section, the same being suitably rigidly secured at its ends to the Z-bars 13.

The underframe of the car consists of center sills 15, transversely extending pressed needle beams 16—16 and channel side sills 17. Except for the portions adjacent the side door openings, the car is provided with a fixed floor 118, it being understood that the fixed floor is omitted adjacent the side doors of the car for a width corresponding to the distance between the two needle beams 16, as best shown in Fig. 6.

In carrying out my invention, I employ pivoted floor doors 18—18 to complete the flooring of the car, each of said doors 18 preferably consisting of a plurality of tongued and grooved planks with edged binding plates 19 therearound and re-inforced by angle irons 20, or other suitable means. Each of said doors 18 is hinged to the corresponding side sills 17, by a plurality of T-bolts 120, as shown in Fig. 3, thereby adapting each door 18 to assume either a horizontal floor position supported at its inner and outer edges on the center sill and side sill, respectively, or a vertical position, as shown in Fig. 3, where it obviously extends across the door opening and rests against the side posts along its vertical edges and against the threshold plate 12, along its bottom edge. To maintain the door 18 in vertical position, when acting as a grain door, suitable means may be employed, such as latches best shown in Figs. 4 and 5. Each of said latches preferably consists of a rotatably mounted short shaft 21, having a finger 22 extending radially therefrom, adapted to enter a recess 23 in the side wall structure, said shaft having an operating finger piece 24 at its inner end to facilitate manipulation.

In actual practice, a floor door made in accordance with the foregoing description will, when in vertical position, extend upwardly approximately two-thirds of the necessary height for retaining the grain and in order to complete the grain door, I use supplemental doors or extensions 25, as shown in Figs. 3 and 4. Each of said supplemental doors or extensions 25 may consist of a plurality of boards suitably bound together and, when rested upon the floor door 18, held in operative position by latches similar to those previously described. Said supplemental doors or extensions, when not in use, may be stored beneath the floor doors 18 and within the shallow hopper provided by the sub-floor hereinafter described. To facilitate handling of the floor doors 18, the latter may be provided with suitable rings 26 pivotally attached thereto and arranged to lie flush with the door when the latter is in horizontal position.

In carrying out my invention, I provide, opposite each side door opening of the car, a sub-floor 27 in the form of a metal sheet, of approximately rectangular outline. Said sub-floor sheet, for the major part of its area extends horizontally as shown in Figs. 3 and 6 and around its edges is bent upwardly, as indicated at 27ª—27ª, until they meet the corresponding members of the underframe and are thence extended vertically as indicated at 27ᵇ, the latter edge portions being then riveted to the center sill, needle beams and side sill, respectively. With this arrangement, as will be obvious, I obtain a shallow hopper which does not, however, project downwardly below the level of the center sills. Said sub-floor 27 also serves to strengthen the underframe.

To provide for the discharge of sufficient grain to relieve the grain doors, each sub-floor 27 has a rectangular opening 28 therein closely adjacent the side of the car and preferably located centrally of the door opening. Fitting within said opening 28 is a rectangular metal chute or spout 29 having suitable laterally extended flanges 30, by which it is secured in position by riveting to the sub-floor 27 and side sill, as best shown in Figs. 3 and 6. Pivotally mounted on the chute or spout 29, is a door or closure 31, the same being hinged as indicated at 32, said door or closure element 31 having its upper face suitably recessed as indicated at 33 to thereby fit over the lower edges of the chute and thus obtain a grain seal. Said door or closure 31 has integrally formed therewith, an outwardly extended arm 34, by which it may be lifted to closed position.

For holding the relief door 31 in closed or operative position, I provide the following means. Pivotally secured to the outer wall of the chute casting 29, as indicated at 35, is a shouldered lever or latch 36, the shoulder of which is adapted to engage under the relief door arm 34 and hold the latter in closed position, as clearly shown in Figs. 1 and 3. A cam plate 37 is also pivotally mounted on the chute casting 29 to pivotally lock the latch in operative position, as shown in Fig. 1. To the lower end of the latch lever 36 is pivotally connected a twisted link 38, the opposite end of which is extended to a point adjacent the bottom end of the door post 13 at the left, as viewed in Fig. 2, where said link is in turn pivotally connected to an arm 39 on the lower end of a vertically extending operating shaft 40. The latter is disposed within a sheet metal housing 41 secured to the corresponding Z-bar 13, said shaft 40 being journaled at its upper end in a bearing bracket 42, and supported by an annular shoulder on said bearing bracket or by other suitable means. A collar 43 may also be employed on the lower end of the shaft to help sustain it where it passes through a plate 44, constituting a part of the housing therefor. At its upper end, the shaft 40 has a radially extended short forked arm 46, to which is pivotally attached an operating lever or handle 47 adapted to fall normally to a vertical depending position as shown in Fig. 3 within the housing plate 41. The latter is suitably cut away as indicated at 48 in Fig. 3, to allow the handle 47 to swing into inoperative position or to be swung outwardly to horizontal operative position, the opening 48 being laterally enlarged at its lower end as indicated at 48ª to facilitate admission of the operator's hand and laterally cut away as indicated at 48ᵇ to allow the handle and shaft to swing when operating the mechanism.

By referring to Fig. 2, it will be observed that when the handle 47 is elevated to horizontal position and then swung in a counter clockwise direction, the link 38 will be shifted toward the left, thus disengaging the shouldered latch 36 from the handle 34 of the relief door 31 and allowing the latter to fall open, it being assumed that the cam 37 has previously been shifted to inoperative position. It will be further observed that the operating handle 47 is inaccessible for operation when the usual side door 49 is in closed position over the side door opening and hence, when said side door is in closed position and sealed with the usual lead seal, it is impossible to discharge any of the grain without first breaking the seal and thereby leaving visual evidence thereof.

As a further protection against tampering with the mechanism, the latch 36 and handle 34 of the relief door may be provided with corresponding meeting lugs having alined perforations 50—50 through which another lead seal may be passed. As shown best in Figs. 1 and 6, the sub-floor 27 may be suitably braced by means of transversely extending angle irons 51—51 therebeneath, said angle irons being secured at their inner and outer ends to the center and side sills respectively. By inclining the edges of the sub-floor as previously described, the cleaning out of all of the grain is facilitated at the end of the unloading operation, as will be obvious. From the preceding description, it will be seen that the arrangement which I have provided, while strong and durable, does not add materially to the dead weight of the car and the arrangement is such that it may readily be adapted for application as an attachment to ordinary box cars now in service; and the arrangement positively guards against either tampering or accidental discharge of the grain while in transit.

I have herein shown and described what I now consider the preferred manner of carrying out the invention, but the same is merely illustrative and I contemplate all changes and modifications that come within the scope of the claims appended hereto.

I claim:

1. In a car for the carrying of grain and the like having a door opening and a displaceable floor section adapted to constitute either a portion of the car floor when in one position, or a door for said opening when in another position; a sub-floor adjacent said door opening adapted to be covered at times by said floor section and spaced an appreciable distance therebelow; a discharge door for said sub-floor, said discharge door being of small area compared to the area of the sub-floor and located closely adjacent the side of the car; and means for locking said discharge door in closed position.

2. In a car for the carrying of grain and the like having a door opening and a displaceable floor section adapted to constitute either a portion of the car floor when in one position, or a door for said opening when in another position; a substantially flat sub-floor opposite said door opening adapted to be covered at times by said floor section and spaced an appreciable distance therebelow; a relief closure for said sub-floor, said relief closure being of small area compared to the area of the sub-floor and located closely adjacent the side of the car; and means for locking said relief closure in closed position.

3. In a car having center and side sills and needle beams, a sub-floor united at its edges to said side and center sills and to adjacent needle beams below the tops of the latter, said sub-floor having a discharge opening therefrom and a closure therefor.

4. In a car having center and side sills and needle beams, a sub-floor united at its edges to said side and center sills and to adjacent needle beams below the tops of the latter, said sub-floor having a discharge opening therefrom and a closure therefor, said sub-floor extending horizontally for the greater portion of its area and having its edges inclined upwardly toward the respective underframe members where it is united thereto.

5. In a car having center and side sills, needle beams, floor and side door opening; a sheet metal sub-floor disposed opposite the side door opening, said sub-floor being united along its edges to the side and center sills and to adjacent needle beams below the tops of the latter, said sub-floor having a discharge opening therein and a closure therefor.

6. In a car having means, including a discharge valve, for discharging part of the load and provided with the usual outside door to close the usual side door opening of the car; mechanism for locking said valve including, an operating member disposed inwardly of and concealed by said outside door when the latter is in closed position, said member being movable in a horizontal plane.

7. In a car having a sub-floor and means including a closure element for discharging part of the load through the said sub-floor, said car having an outside door adapted to close a side door opening; mechanism for maintaining said closure element in operative position including an operating member concealed and rendered inaccessible by said outside door when the latter is in closed position.

8. In a car having a side door opening, an outside door adapted to close said opening and a displaceable floor section adjacent the side door opening adapted to be positioned across the side door opening; means, including a closure element, disposed below said floor section when the latter is in horizontal position, for discharging part of the load; and mechanism for maintaining said closure element in operative position including, an operating element concealed and rendered inaccessible by said side door when the latter is in closed position.

9. In a car having means, including a closure element, for discharging part of the load through the floor and an outside door; mechanism for maintaining said closure element in operative position including, a vertically disposed shaft located so as to be inaccessible when said outside door is in closed position.

10. In a car having means, including a closure element, for discharging part of the load through the floor and an outside door; mechanism for maintaining said closure element in operative position including, an operating element, a vertically disposed shaft, a latch and connections between said shaft and latch, the operating element being concealed by the outside door when the latter is in closed position.

11. In a car having a discharge chute and a closure therefor, mechanism for maintaining said closure in operative position including, a latch cooperable with said closure; a vertically extending operating shaft to one side of said chute, and operative connections between said shaft and latch.

12. In a car having a discharge chute and a closure therefor, mechanism for maintaining said closure in operative position including a shouldered latch pivotally mounted on the chute and cooperable with the closure, and devices, operable from a position to one side of the chute, for disengaging said latch from the closure element.

13. In a car having a discharge chute and a closure therefor, mechanism for maintaining said closure in operative position including, a shouldered latch pivotally attached to the chute and cooperable with said closure element; an operating shaft; and a link operatively connected to said shaft and latch.

14. In a grain car having a side door opening and a discharge chute, with a closure therefor, the combination with a housing in one of the door posts of said opening; of operating mechanism disposed within said housing; and connections from said operating mechanism to said closure.

In witness that I claim the foregoing I have hereunto subscribed my name this 9th day of October 1922.

ARGYLE CAMPBELL.

Witnesses:
   Una C. Grigsby,
   H. M. Deamer.